United States Patent [19]
Reid

[11] 3,858,662
[45] Jan. 7, 1975

[54] GRADER BLADE ATTACHMENT FOR TRACTOR

[75] Inventor: Jay H. Reid, Barrington, Ill.

[73] Assignee: Sears, Roebuck and Co., Chicago, Ill.

[22] Filed: Nov. 15, 1973

[21] Appl. No.: 416,007

[52] U.S. Cl.............. 172/297, 172/781, 172/666, 37/42
[51] Int. Cl......................................... A01b 59/044
[58] Field of Search .......... 172/781, 797, 273, 297, 172/803, 804, 801, 225, 666

[56] References Cited
UNITED STATES PATENTS

| | | | |
|---|---|---|---|
| 2,413,467 | 12/1946 | Patterson | 172/297 |
| 3,007,266 | 11/1961 | Brand | 172/273 X |
| 3,604,517 | 9/1971 | Clifford | 37/42 X |
| 3,618,671 | 11/1971 | Chantland | 172/297 |

Primary Examiner—Stephen C. Pellegrino
Attorney, Agent, or Firm—Arnstein, Gluck, Weitzenfeld & Minow; Nathan N. Kraus

[57] ABSTRACT

A grader blade attachment for a riding type tractor. The attachment includes several mounting and adjustment means which permit the blade to be adjusted to operate in a variety of attitudes for greater efficiency and versaltility of operation. Thus, the height of the blade as well as its angular disposition both in vertical and horizontal planes may be readily adjusted.

1 Claim, 5 Drawing Figures

GRADER BLADE ATTACHMENT FOR TRACTOR

FIELD OF THE INVENTION

The present invention relates to a grader blade attachment arranged for mounting on a riding type tractor. The blade is intended to be mounted in depending relation to the frame of the tractor between the front and rear tractor wheels and is adjustable vertically for depth control and, additionally, the blade may be tilted both vertically and horizontally.

SUMMARY OF THE INVENTION

It is an object of the present invention to provide an attachment for a lawn and garden type tractor in the form of a grader blade with the blade being mounted between the front and rear wheels of the tractor and in depending relation to the frame.

Another object of this invention is the provision of a grader blade which is capable of vertical adjustment for depth control and additionally may be tilted both vertically and horizontal for crowning, edging and other functions.

Other and further objects and advantages of this invention will become apparent from the following description when the same is considered in connection with the accompanying drawings.

BRIEF DESCRIPTION OF A PREFERRED EMBODIMENT

Figure 1:
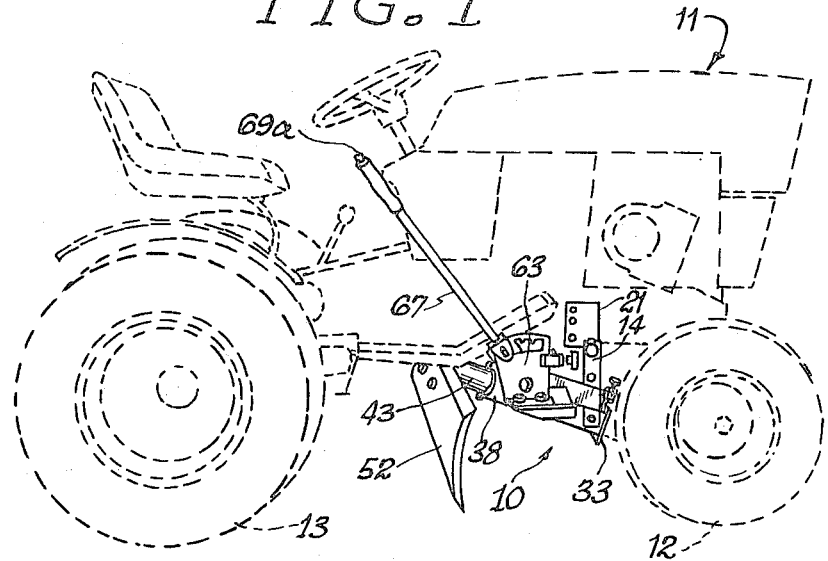
FIG. 1 is a side perspective view showing a grader blade attachment in accordance with my invention and mounted on a tractor which is shown in broken lines.

The grader blade attachment 10 of the present invention is arranged to be secured to the underside of the frame of a lawn and garden type tractor 11, as shown in broken lines in FIG. 1, intermediate the front and rear wheels 12 and 13, respectively.

Figure 2:
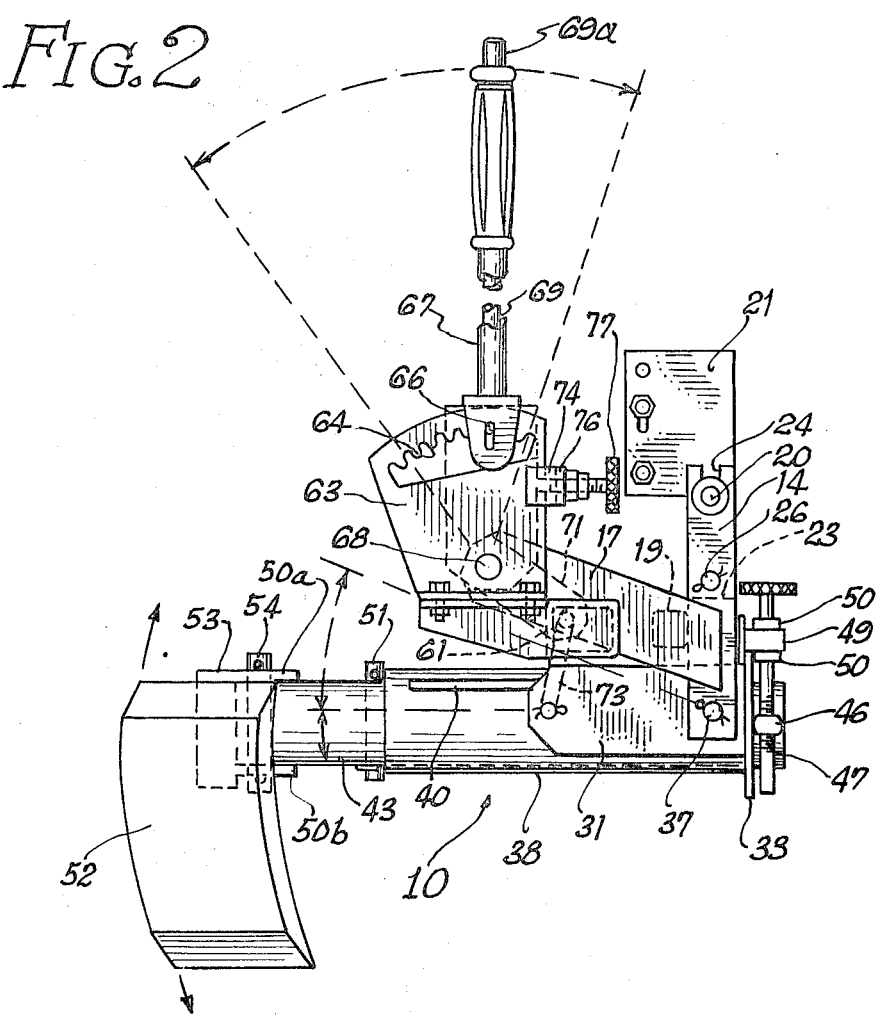
FIG. 2 is a right-side elevational view, on an enlarged scale, of the grader blade attachment shown in FIG. 1.
Figure 5:
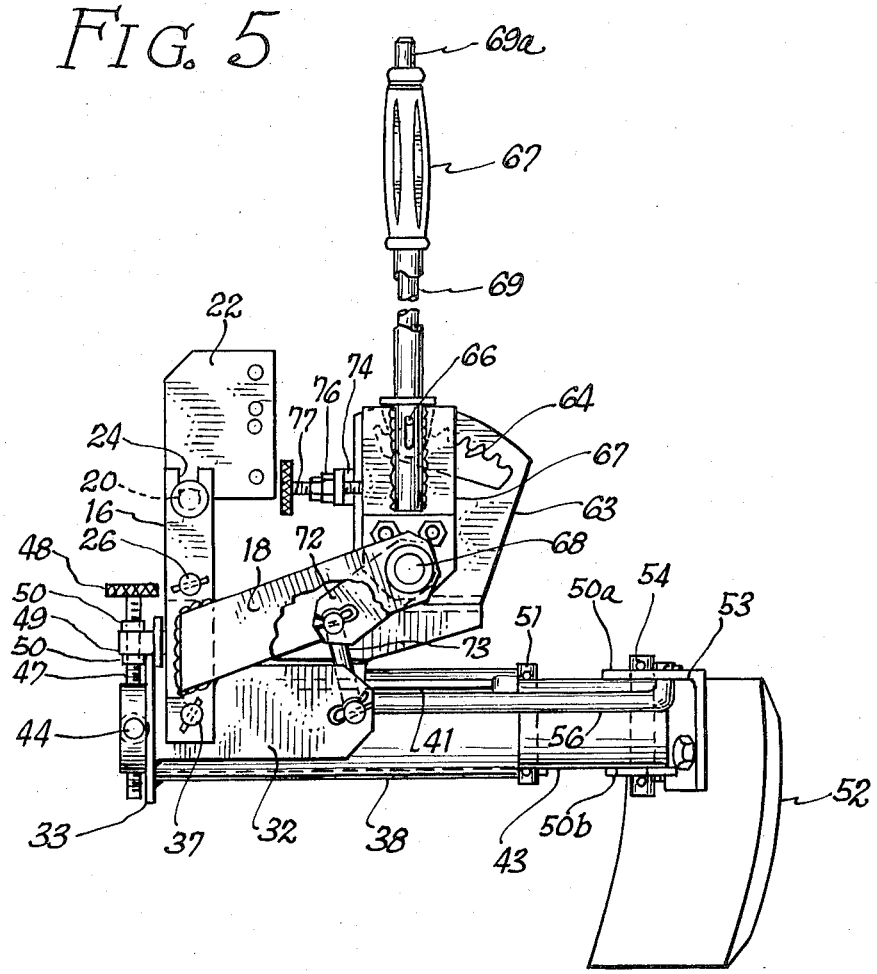
FIG. 5 is a left-side elevational view of the same.

The attachment assembly includes a pair of spaced upright frame members 14 and 16 to which are welded upwardly inclined arms 17 and 18, respectively. A cross bracing tube 19 extends between the arms 17 and 18 and is welded thereto to provide a rigid structure. A pair of mounting brackets 21 and 22 provided with suitable holes to register with corresponding holes in the side frame members of the tractor are arranged to be secured to said side members by bolts passed through the registering holes. Each of the brackets 21 and 22 is provided with a depending leg 23, extending downwardly for a portion of the length of the frame members 14 and 16. As seen in FIGS. 2 and 5, each of the frame members 14 and 16 is provided with a slot 24 opening upwardly to cooperate with a pin 20 carried respectively on the brackets 21 and 22. The frame members 14 and 16 further are provided with holes to register with corresponding holes in the depending legs 23. Pins 26 passed through registering holes serves to secure the members 14 and 16 to the depending legs 23, in assembled relation. It will be seen that upon removal of the pins 26 the grader blade assembly may be detached from the tractor by sliding the assembly downwardly to disengage the slots 24 from the pins 20.

Figure 3:
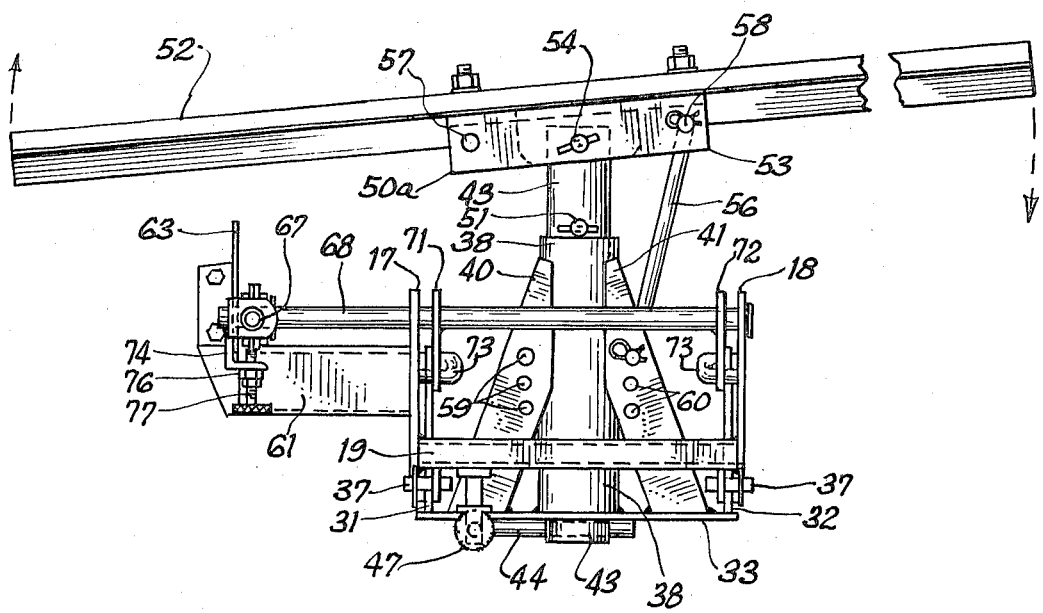
FIG. 3 is a top plan view of the same, with the mounting brackets omitted.

The blade support sub-assembly comprises a pair of side members 31 and 32 welded to a transverse plate 33 to form a generally U-shaped structure. Each of the members 31 and 32 is provided with a forward hole said holes being arranged to register with corresponding holes in the members 14 and 16 to receive pins 37 for pivotally securing the U-shaped frame structure to the members 14 and 16. Referring to FIG. 3, a tube 38 is welded to the plate 33 and is braced to the plate by rigidifying members 40 and 41 which are welded to the tube and to the plate. Thus, the plate 33, tube members 31 and 32 and rigidifying members 40 and 41 form a unitary structure.

Concentrically and rotatably received within the tube 38 is an inner tube 43 which extends through the plate 33 in a forwardly direction, as seen in FIGS. 2 and 3. A pin 44 extends through registering apertures in the extended portion of tube 43 and terminates in a threaded nut portion 46. An adjusting screw 47 provided with a turning knob 48 passes through a lug 49 welded to the plate 33. A pair of washers 50 welded to the screw 47 and disposed on opposite sides of the lug 49 permit the screw 47 to be rotated without axial movement to effect rocking of the tube 43 in a clockwise or counterclockwise direction, as the case may be. The tube 43 is provided with registering apertures to receive a pin 51 which together with the pin 44 secures both tubes in assembled relation while preventing axial movement of the tube 43 relative to the tube 38.

A grader blade 52, shaped substantially as illustrated, and being generally arcuate in cross-section is provided with a channel-shaped mounting bracket 53 which is bolted to the blade 52. The opposed legs 50a and 50b of the bracket 53 embrace opposite sides of the tube 43 and the bracket 53 is secured to the tube by a pin 54 passed through registering holes in the legs and tube 43. This mounting arrangement permits rocking of the blade 52 about the axis of the pin 54 to a position of adjustment in which the blade 52 may be disposed at a right angle to the axis of the tube 43 or in some other angular relationship. As seen in FIG. 3, the upper leg 50a of the bracket 53 is provided with a pair of spaced holes 57 and 58 and each of the bracing members 40 and 41 is provided with a series of linearly alined holes 59 and 60, respectively. Thus, to effect adjustment of the blade 52 in relation to the tube 43 the legs of the bar 56 are placed in appropriate holes 57 and 59 or 58 and 60. In the relationship illustrated in FIG. 3, the blade 52 is fixed in a position which is angularly inclined in relation to a plane normal to the axis of the tube 43. It will be understood that the blade 52 may be rocked either clockwise or counterclockwise, as viewed in FIG. 3, and fixed in a position of adjustment by the bar 56. It will also be understood that the bar 56 may be placed on the opposite side of the tube 43, such positioning being determined by the use to which the grader blade 52 is being put.

Figure 4:
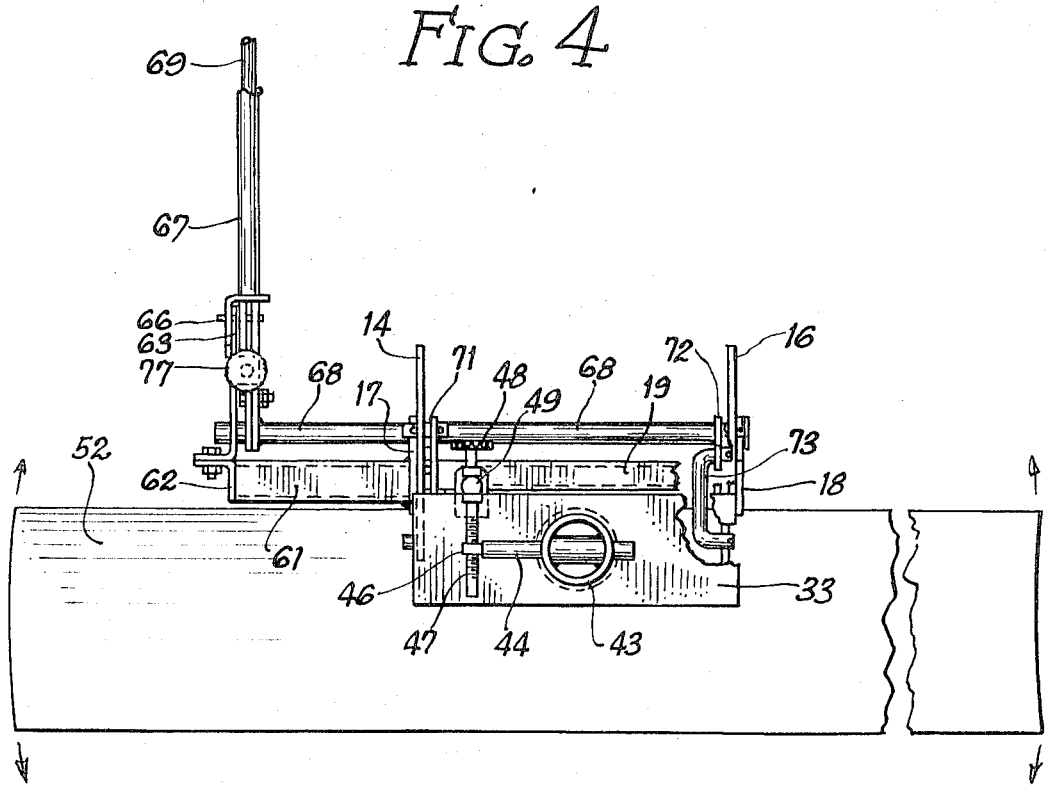
FIG. 4 is a front elevational view of the same.

Referring to FIGS. 2 and 4, welded to the member 17 and extending laterally thereof is an arm 61 which is tubular in cross-section and welded to the distal end of the arm 61 is an angle member 62. A quadrant plate 63 is bolted to the member 62, the plate being provided with the usual arcuately arranged spaced teeth 64. A spring biased detent pin 66 carried on a handle lever 67 is received in the spaces between the teeth. The lower end of the lever 67 is welded to the shaft 68 which is jounalled in plate 63 and frame members 17 and 18. The lever 67 which is tubular includes an inner axially movable rod 69 the lower end of which is carries the detent pin 66. The upper end of the rod 69 extends through the lever 67 and provides a thumb engageable button 69a for moving the detent 66 out of engagement with the spaces between the teeth 64. It will be understood that the rod 69 normally is biased by a spring, not shown, in a direction so that the detent 66 engages in the spaces between the teeth 64.

Welded to the shaft 68 are a pair of arms 71 and 72, each being provided at its distal end with a hole into which is hooked one end of a lift link 73, two such links being provided. The opposite ends of the lift links 73 are engaged in holes at the ends of the arms 31 and 32, as seen clearly in FIGS. 2 and 5.

Welded to the quadrant plate 63 is a bracket 74 to which is welded a nut 76 in which is received an adjusting screw 77. As seen clearly in FIGS. 3 and 4, the end of the screw is disposed in the path of travel of the lower end of the lever 67 so that adjustment of the screw 77 will afford a stop for the movement of the lever in a clockwise direction, as viewed in FIG. 2. This stop limits the height to which the blade may be adjusted.

As was hereinabove noted, the mounting plates 21 and 22 are intended to be mounted on the tractor intermediate the front and rear wheels and to remain more or less permanently attached so as to afford rapid mounting or demounting of the blade assembly to the tractor. The assembly 10 is positioned under the tractor frame and is elevated by any suitable means to cause the slot 24 to embrace the bolts 20 and to effect registration of the respective holes so that pins 26 may be inserted through the appropriate holes. The assembly 10 is now mounted on the tractor and the several adjustments which may be effected on the blade assembly will now be explained.

Adjustment of the elevation of the blade 52 is effected through rocking of the handle 67 within the limits of the toothed segment 64. Thus, as seen in FIG. 2, rocking of the handle 67 to the right will effect lowering of the blade 52 while rocking of the handle in a counterclockwise direction will effect elevation of the blade 52. It will be seen that movement of the levers 71 and 72 through the lift links 73 will effect pivotal movement of the sub-assembly carrying the blade 52. The positioning of the detent 66 in a particular space between adjacent teeth 64 will lock the blade in a position of adjustment. In the event that the blade is to be moved to operative and inoperative positions and it is desired that a lowered position be fixed, the adjusting screw 77 may be rotated to limit the downward movement of the blade.

Referring to FIG. 3 the position of the blade 52 in relation to the axis of the tube 43 may be adjusted by positioning the bar 56 in the appropriate holes 57 or 58, in the mounting bracket 53 and in the holes 59 or 60 in the brace members 40 and 41.

The tilting of the blade 52 in a vertical plane is adjusted by manipulation of the screw 48 which effects a rocking of the tube 43 angularly about the axis of the tube, as illustrated in FIG. 4.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. A grader blade attachement for a vehicle having side frame members supported on front and rear wheels, said attachment comprising a pair of spaced upright members adapted for securement to said vehicle side frame members intermediate said front and rear wheels and extending below said side frame members, a sub-assembly including a generally U-shaped structure having a transverse member and a pair of parallel legs, said legs being pivotally connected to the lower portions of respective upright members, an outer tubular member fixed to said transverse member intermediate said legs and extending parallel to said legs, bracing members connected to said transverse member and said outer tubular member, one of said bracing members having a series of linearly arranged openings, an inner tubular member rotatably supported in said outer tubular member, said inner tubular member having end portions extending beyond the ends of said outer tubular member, a grader blade pivotally mounted on one end of said inner tubular member and extending transversely of and below the vehicle side frame members between the front and rear wheels, a lever arm fixed to the other end of said tubular member and extending radially thereof, screw means carried on said transverse member and operatively engaged with said lever arm for rocking said inner tubular member about its longitudinal axis to adjust the angular disposition of said grader blade in a vertical plane, a link connected at one end to said grader blade and being adjustably slectively connected at the other end to one of said linearly arranged openings to adjust the angular disposition of said blade in a horizontal plane, a pair of rigid arms, each fixed to a respective upright member, a shaft journaled in said rigid arms, a lever fixed to said shaft and carrying a detent, a plate fixed to one of said rigid arms and having a series of arcuately arranged recesses to receive said detent, a pair of lever arms rigid with said shaft, link members connecting said lever arms with the legs of said U-shaped assembly, said lever being manually operative to rock said subassembly to move said grader blade vertically to one of a plurality of positions of operation.

* * * * *